United States Patent [19]

Schutze

[11] 3,910,694

[45] Oct. 7, 1975

[54] SLIDE PROJECTION AND SOUND REPRODUCTION SYSTEM

[75] Inventor: Siegfried Schutze, Dresden, Germany

[73] Assignee: VEB Pentacon Dresden, Dresden, Germany

[22] Filed: Apr. 11, 1974

[21] Appl. No.: 460,260

Related U.S. Application Data

[63] Continuation of Ser. No. 262,924, June 9, 1972, abandoned.

[52] U.S. Cl. .................................................. 353/15
[51] Int. Cl.$^2$.......................................... G03B 31/06
[58] Field of Search ................................ 353/15–19

*Primary Examiner*—Richard E. Aegerter
*Assistant Examiner*—A. Jason Mirabito
*Attorney, Agent, or Firm*—William Anthony Drucker

[57] ABSTRACT

A slide projection and sound reproduction system has a synchronized forward and reverse movement of both a tape of a sound recorder and also of individual slides in magazines or strips of a film of a projector by means of a transport mechanism. A pilot head is mounted on the recorder and is influenced by the tape. An impulse storage device is connected between the pilot head and the transport mechanism of the slide projector.

7 Claims, 2 Drawing Figures

SLIDE PROJECTION AND SOUND REPRODUCTION SYSTEM

This is a continuation of application Ser. No. 262,924 filed June 9, 1972 now abandoned.

BACKGROUND OF INVENTION

The invention relates to a slide projection and sound reproduction system with synchronized forward and reverse movement both of the tape in sound recorders and of the individual slides in magazines or on strips of film in slide projectors, for the purpose of audio-visual lectures.

Systems are known in which tape recorders and film or slide projectors are combined in such a way that by means of a pilot head provided on the sound reproduction unit control signals can be emitted for the image changing mechanism or for other operations connected with the projection of the slides. As is known, this purpose is served by a tape with more than one track, at least one of which is used for spoken explanations or possibly for background music, sound effects etc., relating to the slides being shown, this synchronization being accompanied by the recording of control signals by the pilot head unit on a special additional track.

For audio-visual lecturing or teaching and similar purposes it is desirable to be able to interrupt the synchronized succession of slides and reproduction of speech, to repeat certain sections or to show later slides in advance whenever desired. For this purpose devices are known which ensure that the synchronism between the sequence of images and the sound tape will not be interrupted. This system suffers from the drawback of the considerable time consumed and the fact that use is made of a special magnetic recorder with only one constant tape run speed for the forward and reverse directions. In this case the speed at which the tape runs corresponds to the switching rate of which the slide change mechanism is capable. With the customary commercial magnetic recorders, providing for a rapid forward and reverse movement as well as for a slow tape run, image and sound will no longer be properly synchronized if the advance showing of a slide situated a good way ahead in the sequence is occasionally required.

The purpose of the invention is to enable the above drawback to be overcome by the use of only one special magnetic recorder with only one constant slow tape run, enabling rapid forward and reverse movement of the tape to be obtained by the operation, on very simple lines, of a combined normal multi-track magnetic recorder and projector, without thereby disturbing the synchronism between image and sound during the audio-visual demonstration.

The aim on which the invention is based is that of enabling the synchronized motion of the individual slides and the corresponding speech or background music on the tape to be interrupted as desired, for the purpose of repeating certain slides already shown or of showing certain later slides in advance, the synchronism between image and sound being automatically restored after a rapid forward or reverse movement of the tape.

SUMMARY OF THE INVENTION

The invention solves this problem by providing, between the magnetic recorder and the slide projector, an impulse store electrically controlled by the pilot head of the former. According to the invention, the impulse store consists of an impulse former stage, an electromagnetically driven impulse counting mechanism and a motor-driven follow-up unit. The impulse store may consist of any suitable storage device for example a circuit of bistable flip-flop stages or ferrite core stores.

The invention offers the advantages of universally and immediately applicable commercial tape recorders with rapid forward and reverse movement and of the ease with which the entire combined slide projection and sound reproduction system is operated.

In a suitable further application of the principle on which the invention is based, the impulse former stage consists of a monostable multi-vibrator. As a further development of the invention, the impulse counting mechanism consists of a stepping mechanism already known per se and operated by electro-magnets, the disc provided with stepping teeth bearing a switch for the opening and closing of an electric circuit for the follow-up motor. The invention provides that parallel with the toothed disc of the stepping mechanism a further disc is to be included, possessing a number of lugs or pins and in gearing connection with the follow-up mechanism, the gearing in question being a reduction gearing. The invention provides that the periphery of the disc for the follow-up mechanism is to bear lugs or teeth for the opening and closing of a further electric contact for the current circuit of the slide changing device, corresponding in number to the teeth on the disc of the stepping mechanism. A shaft connecting the disc for the follow-up mechanism with the reduction gearing bears a cam disc which operates the contact for the current circuit of the slide changing device and which is situated between the discs of the stepping and follow-up mechanisms.

BRIEF DESCRIPTION OF DRAWINGS

The invention will now be described by way of example with reference to the accompanying drawings, wherein.

DESCRIPTION OF PREFERRED EMBODIMENTS

Figure 1:
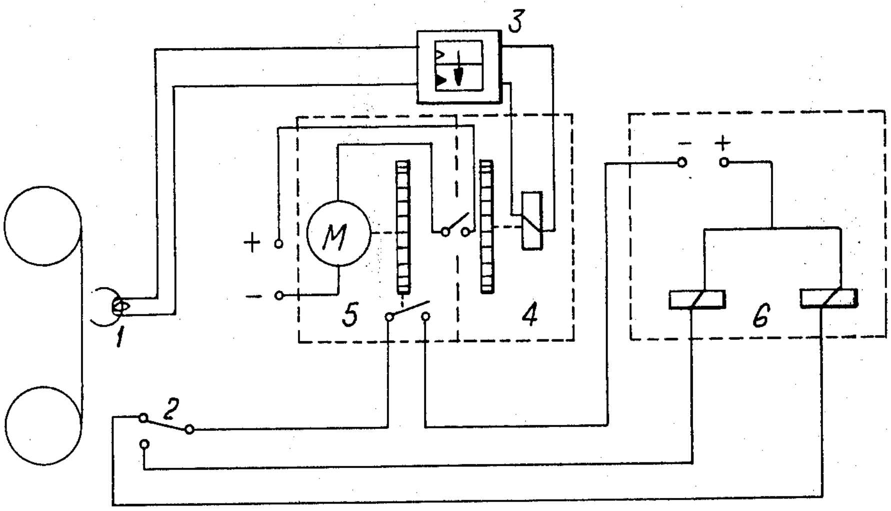
FIG. 1 is a block diagram of the system

In FIG. 1 the control of all functions such as start, projection with sound forwards, rapid forward and reverse running of the tape and the stopping of the latter are effected by the appropriate function selector switches belonging to the magnetic recorder and not shown in the drawing. The tape run of the magnetic recorder includes not only the sound head, not shown, but also the pilot head 1 and the direction selector 2 for the slide change mechanism. The pilot head 1 is followed by an impulse former stage 3, which may consist of a monostable multivibrator. The impulse former stage produces impulses of constant length from the impulses which arrive from the multi-track magnetic tape, and which owing to the different tape speed show considerable frequency and length differences. A utilizable signal for actuating the impulse counting mechanism is described hereinafter in greater detail. The impluse counting mechanism 4 and the follow-up mechanism 5, forming together one constructional unit, emit the switching impulses for the forward and reverse movement of the slide changer 6 or of a film tape guide device not shown in detail, doing so according to the particular position occupied by the direction selector 2 controlled by the magnetic recorder.

Figure 2:
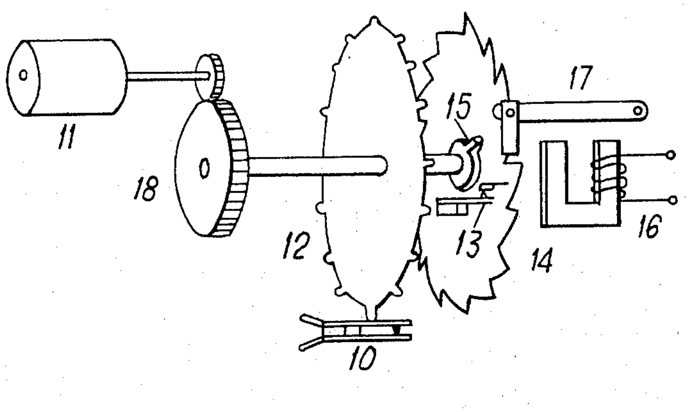
FIG. 2 is a schematic diagram of the impulse store shown in the system of FIG. 1.

FIG. 2 provides an isometric diagram of the most important parts of the impulse counting mechanism 4 shown in FIG. 1 and of the follow-up mechanism 5. The disc 14, provided with stepping teeth, bears a switch 13, which consists of contact springs and which serves for the opening and closing of an electric circuit for the follow-up motor 11. A pawl 17, actuated by the electro-magnet 16, which receives its current impulses from the impulse former stage 3, combines with disc 14 to form the impluse counting mechanism 4. Between the disc 14 and the follow-up motor 11 is a further disc 12, which is provided with lugs or pins and which is situated, for instance, parallel to the disc 14 and which is inconnected with the follow-up motor 11 by a reduction gearing 18. To a shaft connecting the gearing 18 with the disc 12 is affixed a cam disc 15 which actuates the switch 13 and which is advantageously situated between the discs 12 and 14. The impulse former stage 3 produces impulses of constant length from the impulses arriving from the tape.

The slide projection and sound reproduction system operates as follows:

If the sound tape supplies, via the pilot head 1, a change impulse by which the magnet 16 is energized via the impulse former stage 3, then the disc 14 of the impulse counting mechanism 4 is caused to move one step in the clockwise direction by means of the pawl 17. On the rotation of the disc 14 the switch 13 which is mounted on the disc, which, with the cam disc 15 secured on the shaft 19 in the position of rest, keeps the current circuit for the follow-up motor 11 open, will alter its position. When the switch 13 leaves the cam 15 by movement of the disc 14 the current circuit for the follow-up motor 11 is closed, so that the said motor begins to run. The disc 12, set in rotation by the gearing 18, actuates by means of the lugs, which are situated, for example, on the periphery of the disc, a switch 10 which serves to open and close the current circuit for the slide changing mechanism 6, which is driven by a motor, not shown in detail in the drawing. The clockwise rotation of the disc 12 is simultaneously accompanied by the rotation of the cam disc 15, this continuing until the said cam disc 15 actuates the switch 13 and thus once again interrupts the current circuit for the follow-up motor 11. On the completion of the slide changing operation the disc 12 has in the meantime rotated to the extent required to ensure that one of the lugs or pins provided on the disc 12 has once again left the switch 10, as a result of which the current circuit for the slide change mechanism is again opened. The ratio of the gearing 18 is selected to ensure that the impulses emitted by the switch 10 to the slide changer can be reliably processed in good time by the change mechanism 6 of the projector, even with a rapid succession of movements, whether in the forward or in the reverse direction. The cycle of operations is thus terminated, and the discs 12 and 14 assume a position which corresponds to agreement between image and sound. The cam disc 15 once again rests by its cam on the switch 13, which keeps the current circuit for the follow-up motor 11 interrupted until a new impulse coming from the magnetic tape energizes the magnet via the impulse former stage 3. The electrical supply conductors to the switch 13 are connected with the motor 11 or the source of current, via slip rings not shown in detail in the drawing, as a result of the rotation of the disc 14, to which are affixed, for example, spring-mounted contact tongues for the said switch 13.

In addition to the switching system shown in the example the invention provides that direction for the forward and the reverse movement of the slide changing device need not be controlled by the magnetic recorder itself and can also be actuated by the stepping mechanism 14,17. In this case two impulse magnets move the disc 14 forwards or backwards, on the "difference counter principle," so that even during the follow-up of the disc 12 the transport mechanism of the sound recorder can already be operated again, without interrupting the synchronism. In this differential control system, moreover, the impulse disc can be arranged to indicate the number of the required slide or of the required film on the strip. In this case, however, the mechanical apparatus involved is somewhat greater than in the example described above.

In a further version it is also possible for the motor drive of the disc 12, via a gearing, to be formed by a toothed disc similar to the disc 14 and operated by a further impulse magnet. The latter is controlled by an electronic impulse transmitter of which the impulse frequency is adapted to the switching capacity of the image change mechanism. The use of stepping motors in place of the discs 12 and 14 is likewise conceivable. In parallel with the direction selector 2 and the switch 10 for the image change mechanism, correcting keys can be provided, in order to effect any desired modifications to the correlation between the images and the respective parts of the sound recording.

In addition to the foregoing version of the impulse counting mechanism or store 4 it is also possible for the impulses coming from the pilot head 1 to the store by purely electronic means. This can be done by means of a storage circuit consisting of bistable flip-flops or a ferrite core store. It is then important to make certain that the storage capacity is in accordance with the tasks to be performed.

I claim:

1. The combination of a slide projector and a sound reproduction system, said slide projector having movable storage means for storing a sequence of slides, means for projecting said slides in a forward or reverse sequence and transport means for effecting respectively forward and reverse movement of said storage means, and said sound reproduction system incorporating magnetic tape and a pilot head adapted to emit control pulses at a variable frequency for slide changing purposes the provision of:

a. first switch means for effecting operation of the transport means, b. drive means for periodically controlling said first switch means to effect operation of said transport means when the drive means is energized, c. a second switch for normally energizing said drive means, d. positionable means normally located at a position to render said second switch inoperative to energize the drive means, e. movable means supporting said second switch, f. control means responsive to said control pulses for moving the second switch supporting means to move the second switch away from said position a predetermined distance for each received pulse to energize said drive means while it is removed from said position, g. and means operated by the drive means for returning the positionable means to said position to render the second switch inoperative to energize the drive means.

2. The slide projector of claim 1 said control means including electromagnetic drive means and an impulse former between said electromagnetic drive means and the pilot head therefrom and emitting pulses to said electromagnetic drive means.

3. The slide projector of claim 2, wherein said said impulse former consists of a monostable multi-vibrator.

4. The slide projector of claim 2, wherein said movable means comprises a toothed disc operated by said electromagnet and bearing said second switch means in the form of contact springs.

5. The slide projector of claim 4, wherein said drive means comprises a second disc, parallel to said toothed disc and having lugs thereon for effecting closure of said first switch means upon the movement of said second disc.

6. The slide projector of claim 5, wherein said lugs are formed on the periphery of said second disc.

7. The slide projector of claim 5, wherein the means operated by the drive means for returning the positionable means comprises a cam member driven in synchronism with said second disc.

* * * * *